US008472324B1

(12) United States Patent
Richardson et al.

(10) Patent No.: US 8,472,324 B1
(45) Date of Patent: Jun. 25, 2013

(54) MANAGING ROUTE SELECTION IN A COMMUNICATION NETWORK

(75) Inventors: David R. Richardson, Seattle, WA (US); Alan M. Judge, Dublin (IE); Eric Jason Brandwine, Haymarket, VA (US); Swaminathan Sivasubramanian, Seattle, WA (US); Bradley E. Marshall, Bainbridge Island, WA (US); Tate Andrew Certain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 211 days.

(21) Appl. No.: 12/826,477

(22) Filed: Jun. 29, 2010

(51) Int. Cl.
*H04L 1/00* (2006.01)

(52) U.S. Cl.
USPC ........................................................ 370/235

(58) Field of Classification Search
USPC ................ 370/235, 237, 238, 390, 395.31, 370/395.21
See application file for complete search history.

(56) References Cited

U.S. PATENT DOCUMENTS

| | | | | |
|---|---|---|---|---|
| 2002/0067725 | A1* | 6/2002 | Oguchi et al. | 370/390 |
| 2003/0063613 | A1* | 4/2003 | Carpini et al. | 370/401 |
| 2004/0004938 | A1* | 1/2004 | Buddhikot et al. | 370/238 |
| 2005/0135363 | A1* | 6/2005 | Horinouchi et al. | 370/389 |
| 2005/0259145 | A1* | 11/2005 | Schrader et al. | 348/14.09 |
| 2009/0122707 | A1* | 5/2009 | Weinman | 370/237 |
| 2009/0141632 | A1* | 6/2009 | Lawrence et al. | 370/235 |
| 2010/0166001 | A1* | 7/2010 | Uttaro et al. | 370/401 |

OTHER PUBLICATIONS

Counter Hack Reloaded a Step-By-Step Guide to Computer Attacks and Effective Defenses, Second Edition, Ed Skoudis, et al., dated Nov. 2006, pp. 59-66.
How the 'Net works: An Introduction to Peering and Transit; Rudolph van der Berg; dated Sep. 2, 2008.
VL2: A Scalable and Flexible Data Center Network; Albert Greenberg, et al.; dated Aug. 2009.
Cisco Policy Based Routing White Paper; accessed Jun. 7, 2010.
Internet Security Systems, Distributed Denial of Service Attack Tools; accessed Jun. 7, 2010.
B. Pfaff, et al., Extending Networking into the Virtualization Layer, Proceedings of the $8^{th}$ ACM Workshop on Hot Topics in Networks (HotNets-VIII), New York City, New York (Oct. 2009).
Towards a Next Generation Data Center Architecture: Scalability and Commoditization; Albert Greenberg, et al.; dated Aug. 22, 2008.

* cited by examiner

*Primary Examiner* — Hassan Phillips
*Assistant Examiner* — Ajay Cattungal
(74) *Attorney, Agent, or Firm* — Knobbe Martens Olson & Bear LLP (57) ABSTRACT

A system, method and computer-readable medium for the determination of a transit route by a computing system distinct from a router are provided. By pre-determining routes for content within a routing environment, routers on the network forward communications according to the pre-determined route. Specifically, by distributing at least some of the route calculations functionality and/or routing entries storage/maintenance from router components (e.g., edge routers), the processing and memory requirements of such router components within the routing environment can be reduced. In one aspect, the distribution of at least a portion of the routing calculation function and routing entry storage/maintenance within a routing environment facilitates the use of lower-capability, cheaper commodity-based routers.

33 Claims, 6 Drawing Sheets

MANAGING ROUTE SELECTION IN A COMMUNICATION NETWORK

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, data to be exchanged is divided into a series of packets that can be transmitted between the content provider and a recipient client computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted between multiple physical networks, or sub-networks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane in which the router learns the set of outgoing interfaces that are most appropriate for forwarding received packets to specific destinations. The second function corresponds to a forwarding plane in which the router sends received packets to a selected outbound interface.

To execute the control plane functionality, routers can maintain a forwarding information base (FIB) that identifies, among other packet attribute information, destination information for at least a subset of possible network addresses, such as Internet Protocol (IP) addresses. In a typical embodiment, the FIB corresponds to a table of values specifying network forwarding information for the router. In one aspect, commercial level routing hardware components can include customized chipsets, memory components and software that allows a single router to support millions of entries in the FIB and/or can process high volumes of data packet routing requests. However, such commercial level routing hardware components are typically very expensive and often require extensive customization. In another aspect, commodity-based routing hardware components are made of more generic components and can be less expensive than commercial level routing hardware components by a significant order of magnitude. However, such commodity-based routing hardware components typically only support FIBs on the order of thousands of entries and/or have limited processing power for processing data packet routing request volumes. Meanwhile, a content provider receiving requests from a high volume of clients may require routers with large memories and/or increased processing power, such as those found in commercial level routing hardware.

Some content providers attempt to facilitate the delivery of requested content, such as Web pages and/or resources identified in Web pages, through the utilization of a content delivery network (CDN) service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices often with consideration of efficient transmission of the requested content to the client computing device and/or consideration of a cost associated with the transmission of the content. Accordingly, CDN service providers often have similar routing needs to a content provider.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Generally described, the present disclosure is directed to the management of network routing by a content or web services provider in order to select routes among multiple transit providers. Specifically, aspects of the disclosure will be described with regard to the determination of a transit route through transit providers by a computing system distinct from a router connected to the transit providers. By pre-determining routes for content within a routing environment, routers on the network forward communications according to the pre-determined route. Specifically, by distributing at least some of the route calculations functionality and/or routing entries storage/maintenance from router components (e.g., edge routers), the processing and memory requirements of such router components within the routing environment can be reduced. In one aspect, the distribution of at least a portion of the routing calculation function and routing entry storage/maintenance within a routing environment facilitates the use of lower-capability, cheaper commodity-based routers. Although various aspects of the disclosure will be described with regard to illustrative examples and embodiments, one skilled in the art will appreciate that the disclosed embodiments and examples should not be construed as limiting.

In one illustrative example, the routing environment having pre-determined routes can be implemented in a CDN. For example, a computing system within the CDN can determine transit routes and/or configure routers within the CDN to forward packets according to the pre-determined routes, thereby redistributing at least some route calculations from the CDN routers.

In addition to the CDN configuration, the routing environment further described below may be advantageously implemented in any number of different network configurations where routing calculations can be redistributed from the routers. For example, a network dealing with multiple external connections, large amounts of packet traffic, or otherwise using high-capability commercial level routers can benefit by implementing the distributed routing environment. In some embodiments, the network can be a data center having multiple computing devices, such as a data center operated by a virtual network provider or a web services provider. Excess computing capacity in the data center can be put to use calculating routing decisions for the network, thereby reducing the computing and/or memory needs for routers in the network. In addition, the route determination process can be used to redistribute computations and/or entries from any sort of router, switch or other network component, not just edge routers. Thus, the routing environment can be used to simplify hardware routing requirements for many types of networks.

In one embodiment, a system for offloading routing decisions for a router is provided, the system comprising: an edge router having transit routes through multiple transit providers and a separate route manager configured to determine the transit route for a target destination based at least partly on routing data received from the multiple transit providers and cause the edge router to forward a communication to the target destination by the determined transit route.

Figure 1:
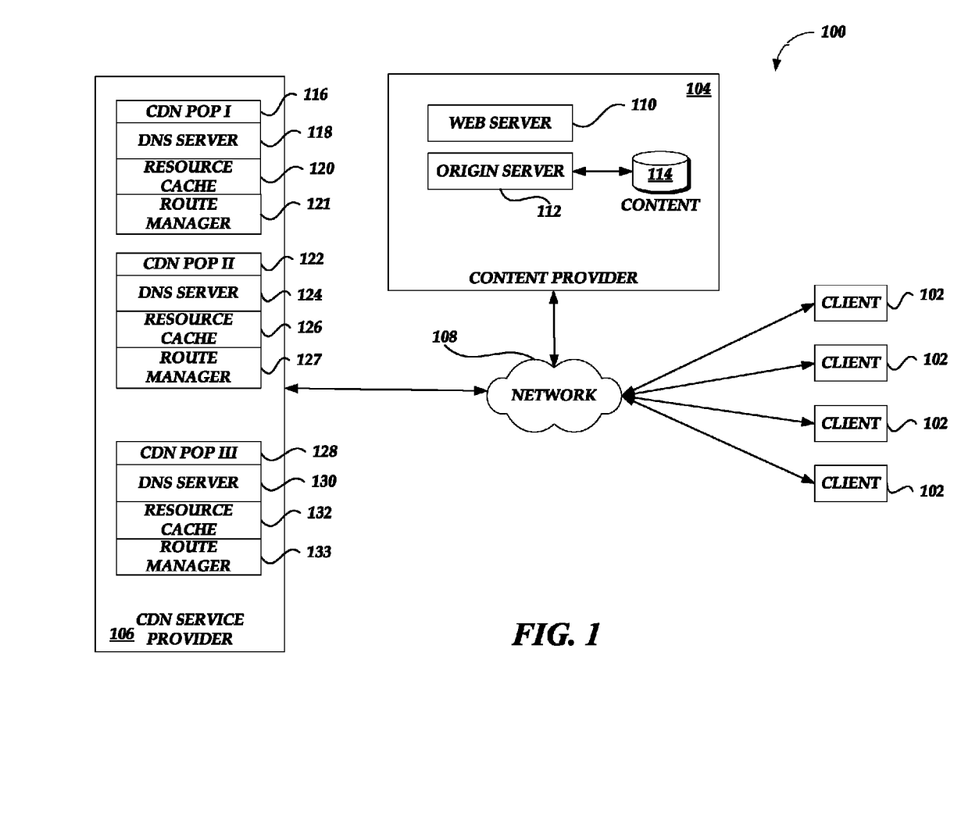
FIG. 1 is a block diagram illustrative of an embodiment of a content delivery environment (CDN) including route manager components capable of making routing decisions.

FIG. 1 is a block diagram illustrative of an embodiment of a content delivery environment 100 having route managers capable of making routing decisions. As illustrated in FIG. 1, the content delivery environment 100 includes a number of client computing devices 102 (generally referred to as clients) for requesting content from a content provider and/or a CDN service provider. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances, and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Additionally, the client computing devices 102 may also include necessary hardware and software components to execute, or otherwise process, route determination executable code as will be described in greater detail below. Some or all of the additional hardware/software components may be embodied in stand alone or specialized components configured for processing the route determination executable code.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS name servers, and the like.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence (POP) locations 116, 122, 128 that correspond to nodes on the communication network 108. Each POP 116, 122, 128 includes a DNS component 118, 124, 130 made up of a number of DNS server computing devices for resolving DNS queries from the client computers 102. Each POP 116, 122, 128 also includes a resource cache component 120, 126, 132 made up of a number of cache server computing devices for storing resources from content providers and transmitting various requested resources to various client computers.

Each POP also includes a route manager 121, 127, 133 made up of one or more computing devices for analyzing routing data and making routing decisions for the transmission of the resources from the resource cache components 120, 126, 132. In some embodiments the routing manager 121, 127, 133 controls routing decisions for the POP and determines which transit provider, such as an Internet Service Provider (ISP) or autonomous system (AS), to use in situations where the POP is connected to multiple transit providers. In an illustrative embodiment, POPs may be associated with one or more edge router components that the receive data to be transmitted from the resource cache components 120, 126, 132 and transmit the data via a route associated with the transmit providers in communication with the particular POP. In accordance with this illustrative embodiment, the route manager 121, 127, 133 controls one or more edge routers associated with the POP by providing pre-determined routing information for the network packets. As such, the edge router components do not need to maintain the routing information nor process routing information to make routing decisions for the network packets.

In an illustrative embodiment, the DNS component 118, 124, 130, resource cache component 120, 126, 132, and route managers 121, 127, 133 are considered to be logically grouped, regardless of whether the components, or portions of the components, are physically separate. Additionally, although the POPs 116, 122, 128 are illustrated in FIG. 1 as logically associated with the CDN provider 106, the POPs can be geographically distributed throughout the communication network 108 in a manner to best serve various demographics of client computing devices 102. Still further, although components, such as a router, may be described as individual hardware components, the components can reference logical functionality implemented by one or more hardware devices. Additionally, one skilled in the relevant art will appreciate that the CDN service provider 106 can be associated with various additional computing resources, such additional computing devices for administration of content and resources, and the like.

Although not illustrated in FIG. 1, each client computing device 102 utilizes some type of local DNS resolver component, such as a DNS Name server, that generates the DNS queries attributed to the client computer. In one embodiment, the local DNS resolver component may belong to an enterprise network to which the client computer belongs. In another embodiment, the local DNS resolver component may belong to an Internet Service Provider (ISP) that provides the network connection to the client computer.

Figure 2:
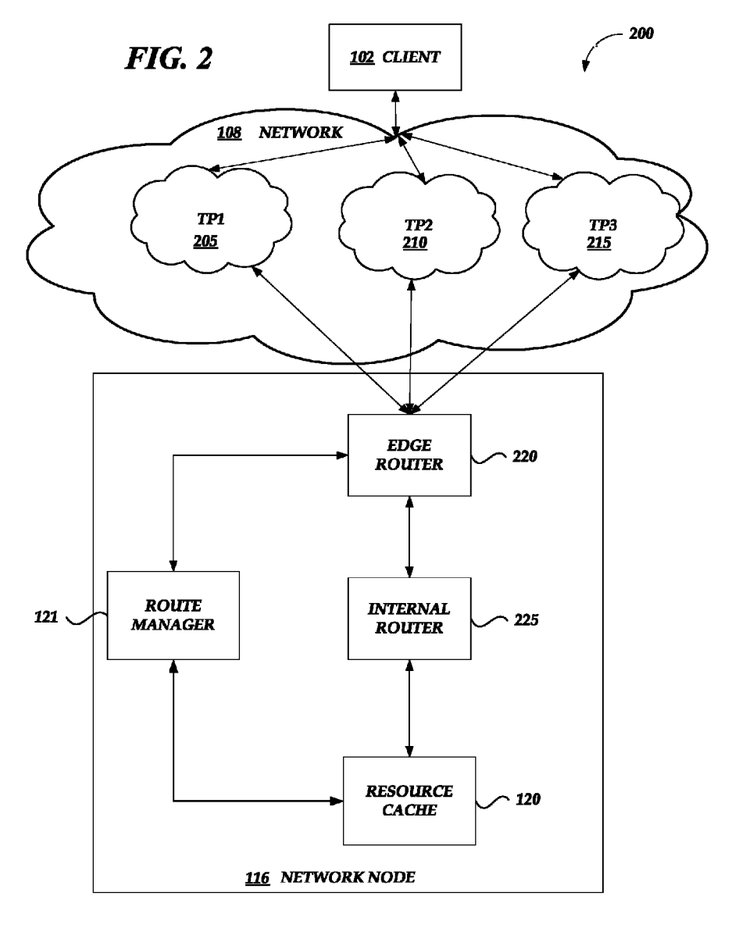
FIG. 2 is a block diagram of an example embodiment of a network node, such as a POP 116 (FIG. 1), having connections to multiple transit providers.

FIG. 2 is a block diagram of an example embodiment of a network node, such as a POP 116 (FIG. 1), having connections to multiple transit providers. The node components can be connected through a network. In some embodiments, the network node is an autonomous system or part of an autonomous system. One skilled in the relevant art will appreciate that a client 102 can transmit communications through a communication network 108 to the network node 116. The client can have multiple possible routes for receiving communications through the network, generally referred to as multi-homed. The client can be multi-homed, with multiple communications links to the network 108, or have a single communications link to the network 108. The network 108 can include multiple transit providers 205, 210, 215, each providing one or more possible routes to the client. Therefore, if one transit route goes down, other transit routes can be used for routing commutations to and from the client.

Referring to FIG. 2, the network node 116 can be multi-homed to decrease the chances of a network link failure preventing operation of the network node. The network node can include an edge router 220 with multiple links to multiple transit providers 205, 210, 215. Thus, if a single link goes down, other links are available. However, supporting multiple transit providers can require a multiplicative increase in the capabilities of the router. In some embodiments, the network node includes additional edge routers for connecting to the transit providers, for example, for backup or to manage other connections.

The edge router 220 can receive external routing data from the transit provider connected to it. The edge router 220 can be configured to selectively process the routing data it receives. For example, the edge router 220 can be configured to pass on routing data without updating its routing tables, such as a FIB or RIB. Rather, the edge router can be configured to update its routing tables from internal sources. Advantageously, this allows routing entries at the edge router to be reduced, particularly if the internal updates are an aggregation of routing data. For example, the internal updates can comprise of only "best" routes.

Ordinarily, routers typically maintain both FIB and RIB tables and can determine independently which route to use in sending network packets. These routing decisions can be based on routing data received from the transit providers and/or additional configuration data, such as routing policies determined by a network administrator. Generally, the greater the number of connected transit providers, the greater the number of routes that need to be tracked by the router, in the RIB and/or the FIB, as each transit provider can present one or more routes for a particular destination. Each connection to a different transit provider can potentially generate several million route entries. In order track and manage the multiple routes, edge routers generally need additional processing capabilities and memory, thus increasing the cost of the router. However, as described in embodiments below, by distributing at least some of the route calculations functionality and/or routing entries storage/maintenance from the router components (e.g., edge routers), the processing and memory requirements of such router components within the routing environment can be reduced.

The network node 116 can include a route manager 121 for processing and determining routes externally from the edge router 220. The route manager can include route determination executable code for determining network routes. In some embodiments, the route manager is in communication with the edge router 220 and receives routing data, such as Border Gateway Protocol (BGP) data, from the edge router. In some embodiments, the routing data is not completely processed at the edge router 220 after being received from transit providers. For example, the edge router may update some internal routing tables based on the routing data, but may update some routing tables based on routing decisions from the route manager 121. The route manager can also send BGP updates to the edge router. In one embodiment, the edge router can be configured to override external BGP updates with internal BGP updates from the route manager 121. By overriding external BGP updates, table entries at edge routers 220 can be reduced. Additionally, the route manager 121 can direct routing decisions made by the edge router 220 by controlling the input used in the edge router's routing determination process. In some embodiments, the route manager 121 is in communication with other components, such as the resource cache 120, and can provide routing decisions in order to manage routing by the other components. For example, the route manager 121 can maintain a routing table or RIB that includes information about routes available to the network node and can generate forwarding or FIB entries for network node components. In some embodiments, the route manager 121 and edge router 220 may be virtual components simulated on the same computing system with routing decisions for the edge router made externally by the route manager.

After selecting routes for various destinations, the route manager 121 can generate forwarding entries, for example, for a FIB, for other network components in the network node, such as the one or more cache servers of the resource cache. In one embodiment, the route manager sends a route or a set of routes for a particular destination to the network components while not sending others, thereby reducing the routes tracked by the other network components. The route manager 121 can select routes based on, for example, network metrics, network costs, internet weather data, monetary costs, client data such as history, payment history, or service level, bandwidth, latency, reliability, loss rate and/or the like. By receiving routing decisions, the edge router, in one embodiment, can reduce or eliminate its RIB as it is not making routing decisions but just switching packets, with switching determined by FIB entries from the route manager.

The route manager 121 can obtain information in addition to the routing data from the edge router 220. The additional data can include network load data, packet drops or loss, packet queue length, throughput, latency and/or other network metric information. Further, the additional data can also be obtained from non-routing sources, such as monetary routing costs for sending traffic on particular transit providers, client history, client service level, and/or the like. The additional data can be used for determining routing decisions for the network node. For example, based on the load on the transit providers, the route manager can engage in load balancing by selecting routes corresponding to transit providers with low utilization.

Further, information sent from the edge router 220 to the route manager 121 or information sent from the route manager 121 to the edge router 220 can be aggregated or otherwise compressed. In one embodiment, routing data from multiple transit providers are combined and then routes filtered. For example, if two routes to the same destination have the same cost, one of the routes can be discarded and only route forwarded. Likewise, the available routes can be sorted based on a routing metric and only some of the routes, for example the top 50%, are forwarded. This aggregation can be performed by the edge router or a computing device associated with the edge router. The aggregation can also be performed by the route manager where the route manager sends the information to another component in the network, such as resource cache 120.

The resource cache 120 can be in communication with the edge router 220 through one or more internal routers or other networking components 225 or can be in direct communication with the edge router. The resource cache can generate a content communication, such as a network packet carrying content, for transmission to clients 102. The resource cache can apply the routing decisions and configure the content communication to travel by a particular route, such as through a particular transit provider. Network components on the route can be configured to route content communications according to the determined route.

In one embodiment, the resource cache 120 can implement at least some of the described functionality for the route manager 121. For example the resource cache 120 can receive routing data and/or additional data and determine routing paths for the network. In one embodiment, the resource cache can include route determination executable code for determining network routes. In some embodiments, the route manager can simply serve as a routing data reflector, aggregating data from one or more edge routers and sending that information to one or more cache servers of the resource cache 120. Each cache server can then determine transit routes for content communications generated at the cache server. In one embodiment, the route manager 121 and resource cache 120 functionality are provided by the same network component or computing system.

Various techniques can be used to control routing at the edge router 220 from a network component distinct from the router, such as from the resource cache 120 and/or route manager 121. For example, the network node may employ tunnels or tags to direct network communications to a particular route. Routes can be assigned a particular identifier or tag, such as a virtual local area network (VLAN) or virtual private network (VPN) tag, and packets destined for that route can be tagged with the identifier. When the edge router 220 receives the communication, the edge router can read the tag and direct the communication through the route associated with the identifier. In one embodiment, tunnels or virtual links may be used to direct communications. For example, Multi-protocol Label Switching (MPLS) allows packets to be labeled; with packet forwarding at receiving routers determined using the labels. Thus, communications content can be labeled by the route manager and/or resource cache for a particular route and routed accordingly. Other similar tunneling techniques may be used, such as VPNs.

In one embodiment, one or more virtual routers operating on one or more computing devices can function as an edge router 220. The edge router 220 can include multiple virtual router instances, where each router instance has different routing polices favoring one of the transit providers. For example, a first virtual router may be configured to prioritize use of TP1 205, such as by setting TP1 as a default route, while a second virtual router is configured to prioritize use of TP2. By using multiple instances of virtual routers, the edge router 220 can operate a particular virtual router in order to direct communications through a particular route. In one embodiment, the virtual router associated with a transit provider controls both ingress and egress of communications for the network, thereby allowing a response to incoming communications to exit through the same transit provider.

In some embodiments, the edge router 220 can have multiple routing tables corresponding to each transit provider, and one routing table is selected as the "active" table in order to direct communications through a particular transit route. The routing table can be activated based on the destination or IP address of the received communication, by a control message sent by, for example, the route manager 121 and/or resource cache 120, or by another triggering mechanism.

In some embodiments, the edge router 220, may determine routing for outgoing packets. However, the resource cache 120 and/or route manager 121 can be configured to send a control message to alter the routing table, such as a FIB, of the edge router 220. For example, a forwarding entry or route update can be sent to the edge router. Thus, while the router can independently determine the route, the determined route would be identical to the route selected by the resource cache 120 and/or route manager 121. By altering routing tables, traffic can be advantageously directed without creating tunnels. In some instances, tunnels can be fragile, particularly where transit providers sometimes go down, therefore having an alternate mechanism for controlling routing can be beneficial.

In one embodiment, cache servers of the resource cache 120 can be grouped together and associated with a particular transit provider. For example, one group of cache servers can be configured to route through TP1 205 while another group is configured to route through TP2 210. Incoming communications, such as content requests, coming from a particular transit provider can be sent to the associated cache servers. The cache servers can then process and respond to the communications using the same transit provider. Thus, ingress and egress from the network node can be through the same transit provider.

Figure 3A:
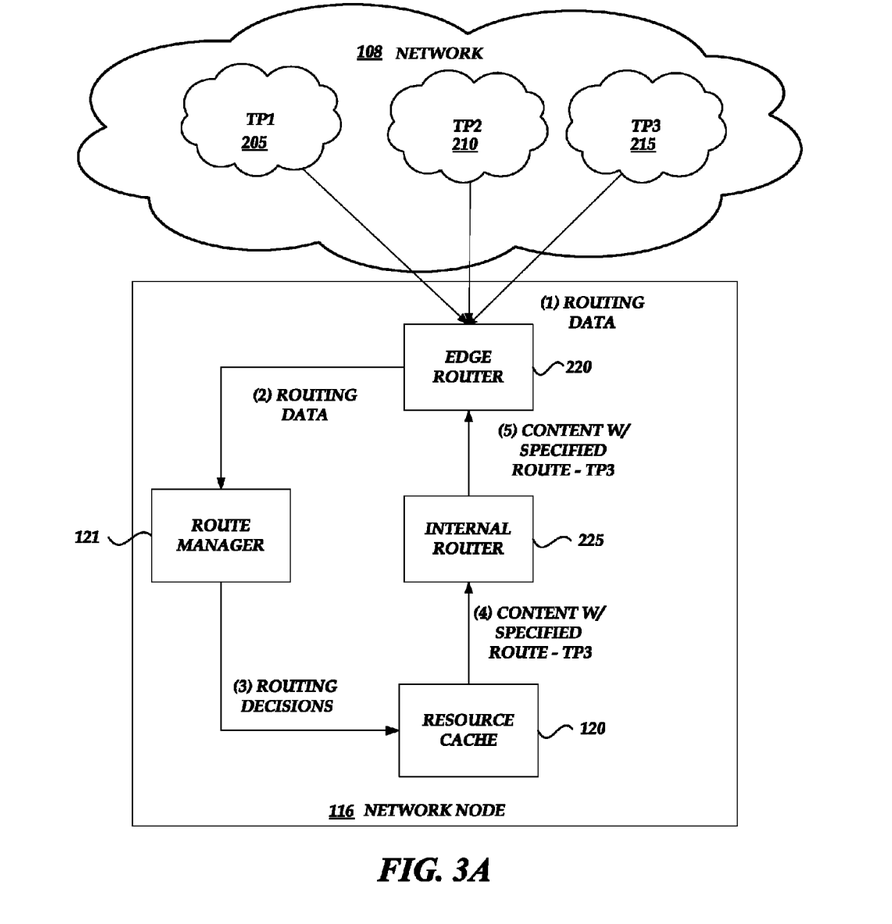
FIGS. 3A and 3B are block diagrams of the network node of FIG. 2 illustrating sample data flows during determination of routing paths for content from the network node.
Figure 3B:
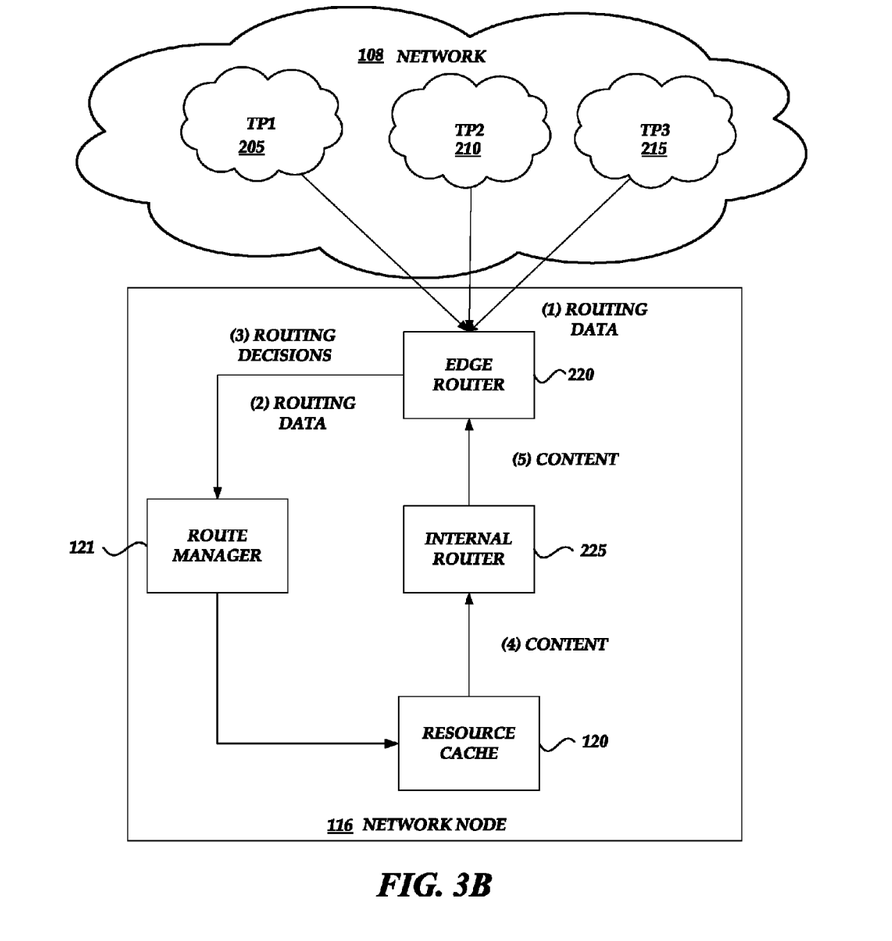
Figure 4:
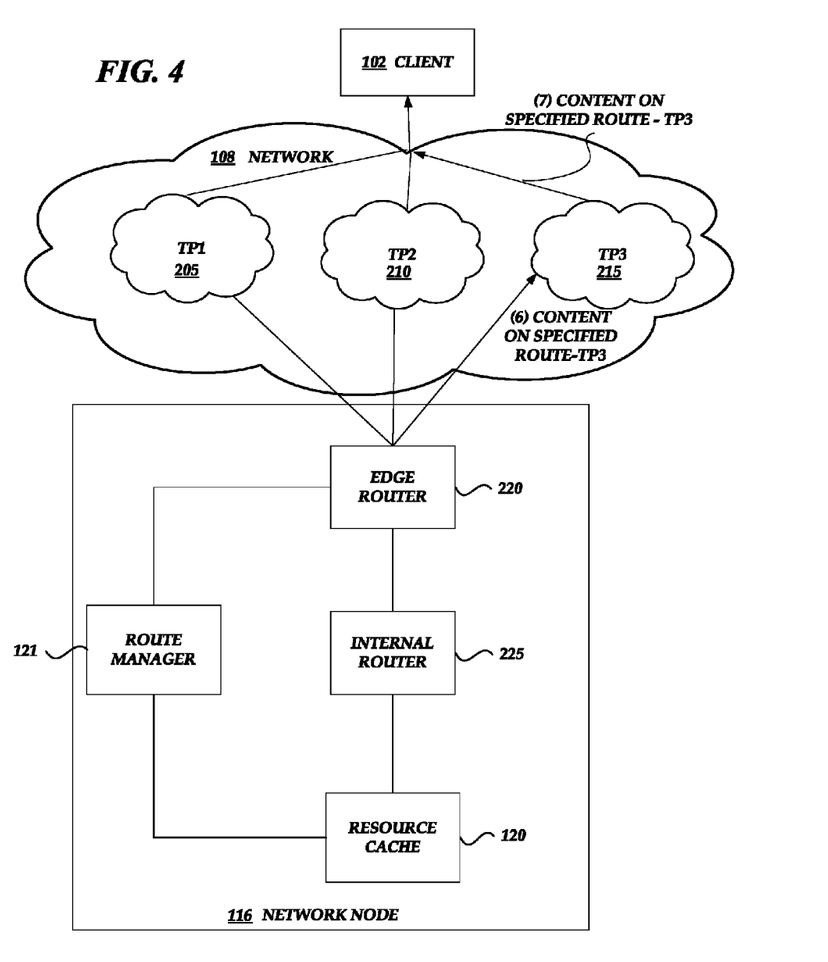
FIG. 4 is a block diagram of network environment of FIG. 2 illustrating the transmission of content to a transit provider connected to the CDN POP.

With reference now to FIGS. 3-4, the interaction between various components of the routing environment 200 of FIG. 2 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

FIG. 3A and FIG. 3B are block diagrams of the network node of FIG. 2 illustrating sample data flows during determination of routing paths for content from the network node.

In the sample data flow of FIG. 3A, data and/or instructions flow through the system 200 by: (1) the edge router 220 receives routing data; (2) the edge router transmits the routing data to the route manager 121; (3) the route manager 121 determines routing decision(s) and transmits the routing decision(s) to the resource cache 120; (4) the resource cache 120 transmits content with a specified route (e.g. TP3), which may pass one or more internal routers 225; and (5) the edge router 220 receives the content.

In the sample data flow of FIG. 3B, data and/or instructions flow through the system 200 by: (1) the edge router 220 receives routing data; (2) the edge router transmits the routing data to the route manager 121; (3) the route manager 121 determines routing decision(s) and transmits the routing decision(s) to the edge router 220; (4) the resource cache 120 transmits content, which may pass one or more internal routers 225; and (5) the edge router 220 receives the content and determines a transit route for the content based at least partly on the routing decision(s) from the route manager 121.

As illustrated in FIGS. 3A and 3B, the route determination process begins with receiving routing data from multiple transit providers 205, 210, 215. The routing data can be sent using BGP or another routing protocol. The routing data can include reachability information, routing costs for routes through each transit provider, and/or other data. After the routing data is received by the edge router 220, the routing data can be sent to the route manager. In one embodiment, the edge router or a reflector device associated with the router can be configured to transmit routing data to the route manager 121, for example, the edge router may be configured as a route reflector with the route manager as a client.

The route manager 121 can then use the routing data to generate routing decisions for communications sent from the network node 116. In one embodiment, the route manager can use non-routing data received from other sources, including network metric information, as inputs for generating the routing decisions. Once routing decisions are made, the route manager can send those route decisions to other network node components, such as the resource cache 120, as illustrated in FIG. 3A. In some embodiments, the route manager sends routing decisions to network components in addition or instead of to the resource cache, such as one or more internal routers 225 and/or edge router 220 as illustrated in FIG. 3B, thereby directing routing within the network. In one embodiment, the route manager passes on the routing data in addition to or instead of the routing decisions, for example, where routing decisions are made at the resource cache instead of at the route manager.

Once the routing decisions and/or routing data are received by the resource cache 120, the resource cache can generate a communication configured to follow the received or generated routing decisions. For example, the resource cache 120 can generate packets with headers or other information in the packet tagging or otherwise specifying a particular route. Network components receiving the communications can be configured to route the communications according to the included information in the communication. In some embodiments, the resource cache 120 can send a control signal or message to other network components in order to control how content communications are routed. For example, the resource cache can send a control signal to change the FIB of the edge router in order to direct routing at the edge router.

FIG. 4 is a block diagram of the routing environment 200 of FIG. 2 illustrating a sample data flow during transmission of content to a transit provider 215 connected to the network node 116. In FIG. 4, the communications leaves the network node 116 and travels on the network 108 on its way to the requesting client 102. When the edge router 220 receives the content communication, the edge router can transmit the router on the specified route. In one embodiment, the edge router does not make any further routing decisions independently, but routes the content communication according to the pre-determined route specified by the route manager and/or resource cache. For example, if the content communication can be designated for routing on TP3 and the edge router sends the content communication on the link connected to TP3 215. In one embodiment, the content communication may be sent via one or more transit providers, for example, for redundancy. In one embodiment, content communications may be sent on different transit providers, for example, in order to load balance traffic on the transit providers. Once received by transit provider, the transit provider can route the communication according to its own routing policies until it reaches the client.

Figure 5:
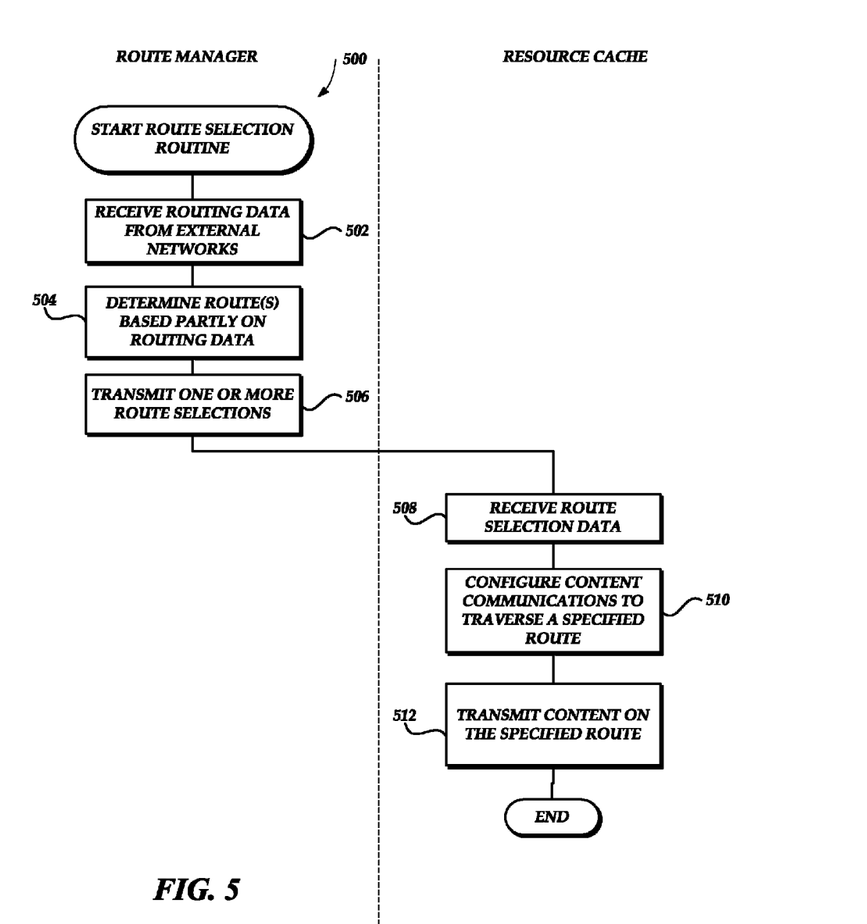
FIG. 5 is a flow diagram illustrative of an embodiment of a route determination process implemented by a computing device.

FIG. 5 illustrates an embodiment of a route determination process 500 implemented by a computing device, for example, by the route manager 121 and/or resource cache 120 of FIG. 2. The route determination process allows route determination to be off-loaded from a router, allowing the use of commodity-based routers to direct traffic on a network, even for a high-traffic network. As illustrated in FIG. 5, portions of the process can be performed by a route manager or a resource cache, either wholly or in combination, and FIG. 5 illustrates one possible embodiment of a division of the process 500 between a route manager and a resource cache. In one embodiment, by dividing the process between components, a portion of the process can be performed by a single or central component while other portions are performed by multiple components. For example, a single route manager can manage routes for multiple resource caches. However, in some embodiments, the process can be performed by a single network component.

The process begins at block 502, where routing data is received from external networks, such as transit providers or autonomous systems. The routing data can be received directly or be passed through an intervening router or network component, such as an edge router in communication with the external networks.

At block 504, the route determination process 500 determines routes based on the routing data. The routing data can include reachability information for one or more destinations. Routes selecting one of the external networks can be generated for a particular destination. For example, traffic for one destination can be assigned a route through one transit provider while another destination can be assigned to another transit provider. In some embodiments, supplemental data in addition to the routing data can be considered in making the routing decisions. For example, internet weather data, monetary costs, client data such as history or service level, bandwidth, latency, reliability, loss rate and/or the like can be taken into account in determining the transit route.

At block 506, the determined routes are transmitted to the resource cache or other network component. In some embodiments where the process 500 is performed by a single component, transmission of the routes may be unnecessary.

At block 508, the route selection data is received, for example, at the resource cache. The route selection data can be used to determine how network communications, such as network packets, are routed in the network. The route selection data may also be received by other network components on the network in order to coordinate handling of communications within the network.

At block 510, a content communication is generated and/or configured to traverse the specified route, based on its destination. For example, tunneling or tagging can be used to specify the path. Routing instructions specifying the route, such as a route path identifying nodes on the route or a route identifier associated with the route, can be included with the content communication. In some embodiments, routing instructions are sent external to the communication, such as in a separate control signal or forwarding instruction.

At block 512, the content is transmitted on the specified route and the process then terminates. The content can be transmitted according to the specified route at least until it leaves the network, when routing control passes to another autonomous system or external network. In some embodiments, the transit route can extend past the network, for example, through a tunnel provisioned through a transit provider. In some embodiments, the specified route can include a selected ending point, such as a particular external network or AS. The ending point can be decided before the content communication reaches the edge of the network, such as a router on the edge of the network. Thus, route determination can be off-loaded from the edge of the network to another part of the network. Advantageously, this allows the use of cheaper commodity-based routers in the network, as routing decisions can be made elsewhere from the router, such as at a central computing system in the network.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for managing routing decisions for a router comprising:
    an edge router in a first network, the edge router having communication links to multiple transit provider networks distinct from the first network;
    a route manager on the first network comprising one or more computing devices, the route manager distinct from the edge router, the route manager configured to:
        select a transit provider network from one of the multiple transit provider networks based at least partly on data supplemental to routing data received from the multiple transit provider networks, the supplemental data obtained from non-routing sources and different from the routing data, the supplemental data including at least monetary costs for sending network traffic on the transit providers networks, the routing data comprising reachable destinations through the multiple transit provider networks;
        identify a communications link exiting the first network to the selected transit provider network; and
        determine a transit route for a target destination located outside the first network, the transit route including the identified communications link; and
    a resource cache on the first network comprising one or more computing devices, the resource cache distinct from the edge router, the resource cache in communication with the route manager, the resource cache configured to:
        obtain the determined transit route for the target destination from the route manager;
        associate a content communication with the determined transit route for the target destination; and transmit the content communication to the edge router;
wherein, in response to receiving the content communication, the edge router is configured to forward the content communication according to the determined transit route.

2. The system of claim 1, wherein the supplemental data comprises at least one of client history and client service level.

3. The system of claim 1, wherein the supplemental data comprises at least one of latency, throughput, network load data, packet drops and packet queue length.

4. The system of claim 1, wherein the resource cache is configured to associate the content communication with the determined transit route by generating a packet header identifying the transit route for the content communication.

5. The system of claim 1, wherein the route manager is further configured to generate a control message causing the edge router to forward the content communication according to the determined transit route.

6. The system of claim 1, wherein the route manager and resource cache comprise the same one or more computing devices.

7. The system of claim 1, wherein the content communication is transmitted along the determined route through a tunneling technique.

8. The system of claim 7, wherein the tunneling techniques comprises one of Multiprotocol Label Switching and Virtual Private Network.

9. The system of claim 1, wherein the route manager receives the routing data from the multiple transit provider networks via the edge router.

10. The system of claim 1, wherein the edge router comprises multiple virtual routers, each virtual router associated with a transit provider and configured to transmit on the communications link of the associated transit provider.

11. The system of claim 1, wherein, in response to receiving the content communication, the edge router transmits the content communication according to the determined transit route without independently selecting an outgoing communications link for the content communication from the edge router's communications links to the transit provider networks.

12. The system of claim 1, further comprising a route reflector associated with the edge router, the route reflector configured to transmit routing data received by the edge router to at least one of the route manager and the resource cache.

13. The system of claim 1, wherein the resource cache comprises one or more cache servers.

14. A system for offloading routing decisions for a router comprising:
an edge router in a first network, the edge router having direct communication links to multiple transit provider networks distinct from the first network; and
a route manager on the first network comprising one or more computing devices, the route manager distinct from the edge router, the route manager configured to:
select a transit provider network from one of the multiple transit provider networks based at least partly on data supplemental to routing data received from the multiple transit provider networks, the data supplemental to the routing data obtained from non-routing sources and different from the routing data, the routing data comprising reachable destinations through the multiple transit provider networks;
identify a communications link associated with the selected transit provider network, the communications link selected from one of the direct communications links to the multiple transit provider networks of the edge router;
determine one or more transit routes for a target destination located outside the first network, the transit route including the identified communications link; and
generate a control message configured to cause the edge router to forward a communication to the target destination by the determined one or more transit routes.

15. The system of claim 14, wherein the route manager comprises a cache server for storing content.

16. The system of claim 15, wherein the control message corresponds to a packet header data for the communication.

17. The system of claim 14, wherein the control message adjusts a forwarding information base associated with the edge router.

18. The system of claim 14, wherein the one or more transit routes are determined at least partly based on the data supplemental to the routing data.

19. The system of claim 14, wherein the data supplemental to the routing data comprises at least one of the following: monetary costs for a transit provider, client history, and client service level.

20. The system of claim 14, wherein the data supplemental to the routing data comprises at least one of the following: latency, throughput, network load data, packet drops and packet queue length.

21. The system of claim 14, wherein the edge router is configured to select a subset of routing data received from the multiple transit providers to forward to the route manager.

22. The system of claim 21, wherein the edge router is configured to select the subset of routing data by:
determining priority for available routes based in part on a routing metric;
selecting a subset of the available routes based in part on the determined priority; and
sending routing data associated with the subset of available routes.

23. The system of claim 21, wherein the edge router is configured to select the subset of routing data by discarding data for at least one route having identical costs to another route.

24. A method for determining routing decisions for a router comprising:
receiving routing data from transit provider networks, the routing data not completely processed at an edge router, on a first network, having connections to each of the transit provider networks, the routing data comprising reachable destinations through the transit provider networks;
selecting a transit provider network based at least partly on data supplemental to routing data received from the transit provider networks, the supplemental data including at least monetary costs for sending network traffic on the transit provider networks, the supplemental data obtained from non-routing sources and different from the routing data, the routing data comprising reachable destinations through the transit provider networks;
identifying a communications link exiting the first network to the selected transit provider network;
determining a transit route to a target destination located outside the first network, the transit route including the identified communications link; and
generating a control message configured to cause the edge router to forward a communication to the target destination by the determined transit route.

25. The method of claim 24, wherein the edge router does not independently select an outgoing connection for the content communication from its connections to the transit provider networks.

26. The method of claim 24, wherein the routing data comprises BGP communications.

27. The method of claim 24, wherein the transit route comprises a network tunnel.

28. The method of claim 24, wherein the transit route is determined at least partly based on the supplemental data.

29. The method of claim 24, wherein the supplemental data comprises at least one of client history and client service level.

30. The method of claim 24, wherein the supplemental data comprises at least one of the following: latency, throughput, network load data, packet drops and packet queue length.

31. Non-transitory computer-readable storage having stored thereon instructions that, when executed, direct a computing system to:

obtain routing data from transit provider networks at a computing system distinct from a router on a first network, the routing data not completely processed at the router, the router having connections to each of the transit provider networks, the routing data comprising reachable destinations through the transit provider networks;

obtain data supplemental to the routing data received from the transit provider networks at the computing system, the supplemental data including at least monetary costs for sending network traffic over the transit provider networks, the supplemental data obtained from non-routing sources and different from the routing data;

select a transit provider network based at least partly on the routing data and the supplemental data;

determine a transit route to a target destination located outside the first network, the transit route including the selected transit provider network; and generate a control message configured to cause the router to forward a communication to the target destination on the determined transit route.

32. The computer-readable storage of claim 31, wherein the control message comprises a content communication.

33. The computer-readable storage of claim 31, wherein the control message adjusts a routing table on the router.

* * * * *

UNITED STATES PATENT AND TRADEMARK OFFICE
CERTIFICATE OF CORRECTION

| | | |
|---|---|---|
| PATENT NO. | : 8,472,324 B1 | Page 1 of 1 |
| APPLICATION NO. | : 12/826477 | |
| DATED | : June 25, 2013 | |
| INVENTOR(S) | : Richardson et al. | |

It is certified that error appears in the above-identified patent and that said Letters Patent is hereby corrected as shown below:

In the Claims

In column 12 at line 51, In Claim 1, change "providers" to --provider--.

Signed and Sealed this
Eleventh Day of March, 2014

Michelle K. Lee
*Deputy Director of the United States Patent and Trademark Office*